US012770032B2

(12) United States Patent
Nomura et al.

(10) Patent No.: US 12,770,032 B2
(45) Date of Patent: Oct. 20, 2026

(54) PREDICTION DEVICE, PREDICTION METHOD, AND PROGRAM

(71) Applicant: Mitsubishi Power, Ltd., Kanagawa (JP)

(72) Inventors: Masumi Nomura, Tokyo (JP); Yusuke Hazui, Tokyo (JP); Shigeru Ano, Yokohama (JP); Kenta Wada, Yokohama (JP); Koshiro Fukumoto, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1067 days.

(21) Appl. No.: 17/258,823

(22) PCT Filed: Jul. 24, 2019

(86) PCT No.: PCT/JP2019/029006

§ 371 (c)(1),
(2) Date: Jan. 8, 2021

(87) PCT Pub. No.: WO2020/039825

PCT Pub. Date: Feb. 27, 2020

(65) Prior Publication Data

US 2021/0287122 A1 Sep. 16, 2021

(30) Foreign Application Priority Data

Aug. 23, 2018 (JP) ................................ 2018-156568

(51) Int. Cl.
*G06N 5/04* (2023.01)
*G06N 20/00* (2019.01)

(52) U.S. Cl.
CPC ............... *G06N 5/04* (2013.01); *G06N 20/00* (2019.01)

(58) Field of Classification Search
CPC ................................ G06N 5/04; G06N 20/00
See application file for complete search history.

(56) References Cited

U.S. PATENT DOCUMENTS

| | | | | |
|---|---|---|---|---|
| 10,402,739 | B2 * | 9/2019 | Kloppenburg | G06N 7/01 |
| 2007/0088550 | A1 * | 4/2007 | Filev | G05B 23/0221 704/245 |
| 2010/0318934 | A1 * | 12/2010 | Blevins | G05B 13/048 700/110 |

(Continued)

FOREIGN PATENT DOCUMENTS

| | | |
|---|---|---|
| JP | 2000-259223 | 9/2000 |
| JP | 2003-314301 | 11/2003 |
| JP | 2004-094437 | 3/2004 |
| JP | 2010-182142 | 8/2010 |

(Continued)

OTHER PUBLICATIONS

Wang, David. "Robust data-driven modeling approach for real-time final product quality prediction in batch process operation." IEEE Transactions on Industrial Informatics 7.2 (Year: 2011).*

(Continued)

*Primary Examiner* — Adam C Standke
(74) *Attorney, Agent, or Firm* — Wenderoth, Lind & Ponack, L.L.P.

(57) ABSTRACT

Provided is a prediction device that outputs a prediction value of process data in consideration of a prediction error of a prediction model. A prediction device includes a data collection unit that collects process data of a device; a prediction model construction unit that constructs a prediction model having a predetermined input variable of first process data as an input value and having a predetermined output variable as an output value, and an error calculation model which calculates a prediction error of the prediction model, based on the first process data collected by the data collection unit; and a prediction unit that outputs a prediction value which is corrected based on a prediction value of the output variable for second process data and a prediction error for the prediction value of the output variable, the prediction value being predicted based on the input variable of the second process data collected by the data collection unit, the prediction model, and the error calculation model.

7 Claims, 8 Drawing Sheets

(56) References Cited

U.S. PATENT DOCUMENTS

| | | | | |
|---|---|---|---|---|
| 2013/0274898 A1* | 10/2013 | Thatikonda | ........ | G05B 23/0224 700/44 |
| 2019/0188584 A1* | 6/2019 | Rao | ..................... | G06F 16/2462 |

FOREIGN PATENT DOCUMENTS

| | | | |
|---|---|---|---|
| JP | 2015-127914 | | 7/2015 |
| JP | 2018010521 A | * | 1/2018 |
| JP | 2018-077823 | | 5/2018 |

OTHER PUBLICATIONS

Li et al., "Regression-based process monitoring with consideration of measurement errors." IIE Transactions 42.2 (Year: 2009).*

Wang, Dan, et al. "Adaptive dynamic surface control for a class of uncertain nonlinear systems in pure-feedback form." Proceedings of the 48h IEEE Conference on Decision and Control (CDC) held jointly with 2009 28th Chinese Control Conference. IEEE (Year: 2009).*

Sabahno et al., "The effect of measurement errors on the performance of variable sample size and sampling interval control chart." International Journal of Engineering, Transactions A: Basics 30.7 (Year: 2017).*

International Search Report issued Oct. 8, 2019 in International (PCT) Application No. PCT/JP2019/029006 with English translation.

Written Opinion of the International Searching Authority issued Oct. 8, 2019 in International (PCT) Application No. PCT/JP2019/029006 with English translation.

* cited by examiner

FIG. 3

| DEGREE OF FREEDOM \ RELIABILITY | 0.900 | 0.950 | 0.990 | 0.995 | 0.999 |
|---|---|---|---|---|---|
| 1 | 6.314 | 12.706 | 63.657 | 127.321 | 636.619 |
| 2 | 2.920 | 4.303 | 9.925 | 14.089 | 31.598 |
| 3 | 2.353 | 3.182 | 5.841 | 7.453 | 12.924 |
| 4 | 2.132 | 2.776 | 4.604 | 5.598 | 8.610 |
| 5 | 2.015 | 2.571 | 4.032 | 4.773 | 6.869 |
| 6 | 1.943 | 2.447 | 3.707 | 4.317 | 5.959 |
| 7 | 1.895 | 2.365 | 3.499 | 4.029 | 5.408 |
| 8 | 1.860 | 2.306 | 3.355 | 3.833 | 5.041 |
| 9 | 1.833 | 2.262 | 3.250 | 3.690 | 4.781 |
| 10 | 1.812 | 2.228 | 3.169 | 3.581 | 4.587 |
| 11 | 1.796 | 2.201 | 3.106 | 3.497 | 4.437 |
| 12 | 1.782 | 2.179 | 3.055 | 3.428 | 4.318 |
| 13 | 1.771 | 2.160 | 3.012 | 3.372 | 4.221 |
| 14 | 1.761 | 2.145 | 2.977 | 3.326 | 4.140 |
| 15 | 1.753 | 2.131 | 2.947 | 3.286 | 4.073 |
| 16 | 1.746 | 2.120 | 2.921 | 3.252 | 4.015 |
| 17 | 1.740 | 2.110 | 2.898 | 3.223 | 3.965 |
| 18 | 1.734 | 2.101 | 2.878 | 3.197 | 3.922 |
| 19 | 1.729 | 2.093 | 2.861 | 3.174 | 3.883 |
| 20 | 1.725 | 2.086 | 2.845 | 3.153 | 3.850 |
| 21 | 1.721 | 2.080 | 2.831 | 3.135 | 3.819 |
| 22 | 1.717 | 2.074 | 2.819 | 3.119 | 3.792 |
| 23 | 1.714 | 2.069 | 2.807 | 3.104 | 3.768 |
| 24 | 1.711 | 2.064 | 2.797 | 3.090 | 3.745 |
| 25 | 1.708 | 2.060 | 2.787 | 3.078 | 3.725 |

PREDICTION DEVICE, PREDICTION METHOD, AND PROGRAM

TECHNICAL FIELD

The present invention relates to a prediction device, a prediction method, and a program.

Priority is claimed on Japanese Patent Application No. 2018-156568, filed Aug. 23, 2018, the content of which is incorporated herein by reference.

BACKGROUND ART

In the related art, a plant or a mechanical device may use a prediction model to guide monitoring or the like. For example, process data is collected and physical models of a device and the like provided in the plant or a statistical technique is used to construct a prediction model. Then, a value which is a norm for a process amount is obtained from the constructed prediction model, and the value is used to perform monitoring, control, and determination of abnormality. Patent Literature 1 discloses a technique where a plurality of data sets that are a part selected from various process data are acquired, each of the data sets is used to construct a prediction model, and an integrated value of prediction values calculated by a plurality of the constructed prediction models is used to monitor a plant or the like.

CITATION LIST

Patent Literature

[PTL 1] Japanese Unexamined Patent Application Publication No. 2015-127914

SUMMARY OF INVENTION

Technical Problem

In general, there is an error in the accuracy of prediction by the prediction model, and there is a possibility that the prediction value is shifted to an unsafe side by the amount of the error. For this reason, when the prediction value based on the prediction model is used as it is to monitor or control the plant, there is a possibility of leading to an undesired result.

In Patent Literature 1, among the plurality of prediction models, a large weight is applied to the prediction value calculated from the prediction model having a small error and a small weight is applied to the prediction value calculated from the prediction model having a large error to calculate a weighted mean of the prediction values to integrate the prediction values, so that the influence of the errors of the prediction models is reduced. However, for example, when a plurality of appropriate prediction models cannot be constructed or the like, the method described in Patent Literature 1 cannot be used.

The present invention provides a prediction device, a prediction method, and a program capable of solving the above-described problem.

Solution to Problem

According to one aspect of the present invention, there is provided a prediction device including: a data collection unit that collects process data of a device; a prediction model construction unit that constructs a prediction model having a predetermined input variable of first process data as an input value and having a predetermined output variable of the process data as an output value, and an error calculation model which calculates a prediction error of the prediction model, based on the first process data collected by the data collection unit; and a prediction unit that outputs a corrected prediction value which is obtained by correcting a prediction value of the output variable with the prediction error calculated based on the error calculation model, the prediction value being calculated based on the input variable of second process data collected by the data collection unit and on the prediction model.

According to one aspect of the present invention, the prediction unit adds or subtracts the prediction error to or from the prediction value to correct the prediction value such that the corrected prediction value is not safer or is less efficient than the prediction value before correction.

According to one aspect of the present invention, the prediction device further includes a state monitoring unit that compares the process data with a predetermined threshold value to determine whether or not the process data is abnormal; and an operation-amount determination unit that calculates an operation amount which improves the corrected prediction value when the state monitoring unit determines that the process data is abnormal.

According to one aspect of the present invention, the prediction device further includes a first output unit that outputs the operation amount, which is calculated by the operation-amount determination unit, to a control device of the device.

According to one aspect of the present invention, the prediction device further includes a second output unit that displays the corrected prediction value and a graph, which visualizes the prediction model, in a superimposed manner.

According to one aspect of the present invention, there is provided a prediction method including: a step of collecting process data of a device; a step of constructing a prediction model having a predetermined input variable of first process data as an input value and having a predetermined output variable of the process data as an output value, and an error calculation model which calculates a prediction error of the prediction model, based on the first process data collected in the step of collecting the process data; a step of collecting second process data of an evaluation target; and a step of outputting a corrected prediction value that is obtained by correcting a prediction value of the output variable with the prediction error calculated based on the error calculation model, the prediction value being calculated based on the input variable of the collected second process data and on the prediction model.

According to one aspect of the present invention, there is provided a program that causes a computer to function as means for collecting process data of a device; means for constructing a prediction model having a predetermined input variable of first process data as an input value and having a predetermined output variable of the process data as an output value, and an error calculation model which calculates a prediction error of the prediction model, based on the first process data collected in a step of collecting the process data; means for collecting second process data of an evaluation target; and means for outputting a corrected prediction value that is obtained by correcting a prediction value of the output variable with the prediction error calculated based on the error calculation model, the prediction value being calculated based on the input variable of the collected second process data and on the prediction model.

Advantageous Effects of Invention

According to the prediction device, the prediction method, and the program, the prediction value based on the influence of the prediction error of the prediction model can be output.

BRIEF DESCRIPTION OF DRAWINGS

FIG. 3 is one example of a table used to calculate a prediction error.

DESCRIPTION OF EMBODIMENTS

First Embodiment

Hereinafter, a prediction device according to a first embodiment of the present invention will be described with reference to FIGS. 1 to 10.

Figure 1:
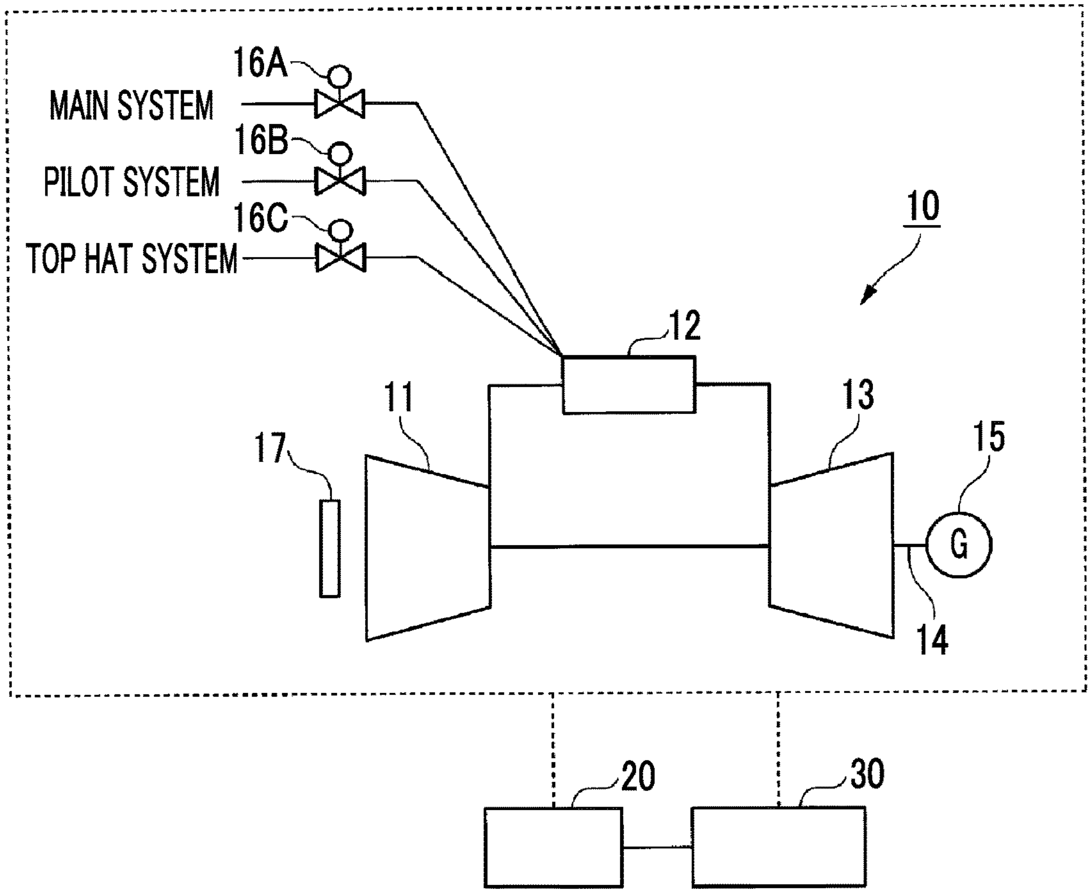
FIG. 1 is a diagram illustrating one example of a plant that uses a prediction device according to the present invention to perform monitoring.

FIG. 1 is a diagram illustrating one example of a plant that uses the prediction device according to the present invention to perform monitoring.

The plant illustrated in FIG. 1 includes a gas turbine 10, a generator 15, a device 20 that controls and monitors operation of the gas turbine 10, and a prediction device 30. The gas turbine 10 and the generator 15 are connected to each other by a rotor 14. The gas turbine 10 includes a compressor 11 that compresses air to generate compressed air, a combustor 12 that combusts fuel gas in the compressed air to generate high-temperature combustion gas, and a turbine 13 that is driven by the combustion gas. The combustor 12 may include a plurality of combustors. Fuel supply devices (not illustrated) are connected to the combustor 12, specifically, systems (a main system, a pilot system, and a top hat system) that supply fuel to the combustor 12. A fuel flow regulation valve 16A that regulates the fuel flow rate of the main system, a fuel flow regulation valve 16B that regulates the fuel flow rate of the pilot system, and a fuel flow regulation valve 16C that regulates the fuel flow rate of the top hat system are provided between the fuel supply devices and the combustor 12. The device 20 is a control device or the like including one or a plurality of computers. The device 20 controls the angle of an inlet guide vane (IGV) 17 to regulate the flow rate of air flowing into the compressor 11 or controls the opening degrees of the fuel flow regulation valves 16A to 16C to control the amount of supply of the fuel gas to the combustor 12 to thus operate the gas turbine 10 to operate the generator 15 while suppressing the combustion vibration level of the combustor 12, NOx and CO of exhaust gas, or the like, which is discharged from the turbine 13, within an allowable range.

The prediction device 30 acquires current various process data from the gas turbine 10 to predict an operating state of the gas turbine 10 based on the acquired process data and a prediction model. For example, a value predicted by the prediction device 30 may be the value of process data, which represents an operating state of the gas turbine 10 for the future ahead of a predetermined time, or may be an estimate value that estimates a value that is not directly measurable. Here, the process data is, for example, measurement data such as temperature and pressure measured by sensors provided at places in the gas turbine 10 and the generator 15. The measurement data includes physical property data of the fuel gas and atmosphere air that are taken into the gas turbine 10 to be used for actual operation, and measurement data of operating environments such as atmospheric temperature and humidity. The measurement data includes identification information of the sensors, measurement values, measurement times, and the like. The process data includes control values (opening degree command values of the fuel flow regulation valves 16A to 16C) that are generated by the device 20 to control the gas turbine 10. The process data includes values converted from the acquired process data or values calculated from a plurality of process data. The prediction device 30 of the present embodiment can output a prediction value corrected to be on a safer side in consideration of a prediction error of the prediction model, whereas a general prediction device outputs a prediction value based on the prediction model. Next, the prediction device 30 will be described.

Figure 2:
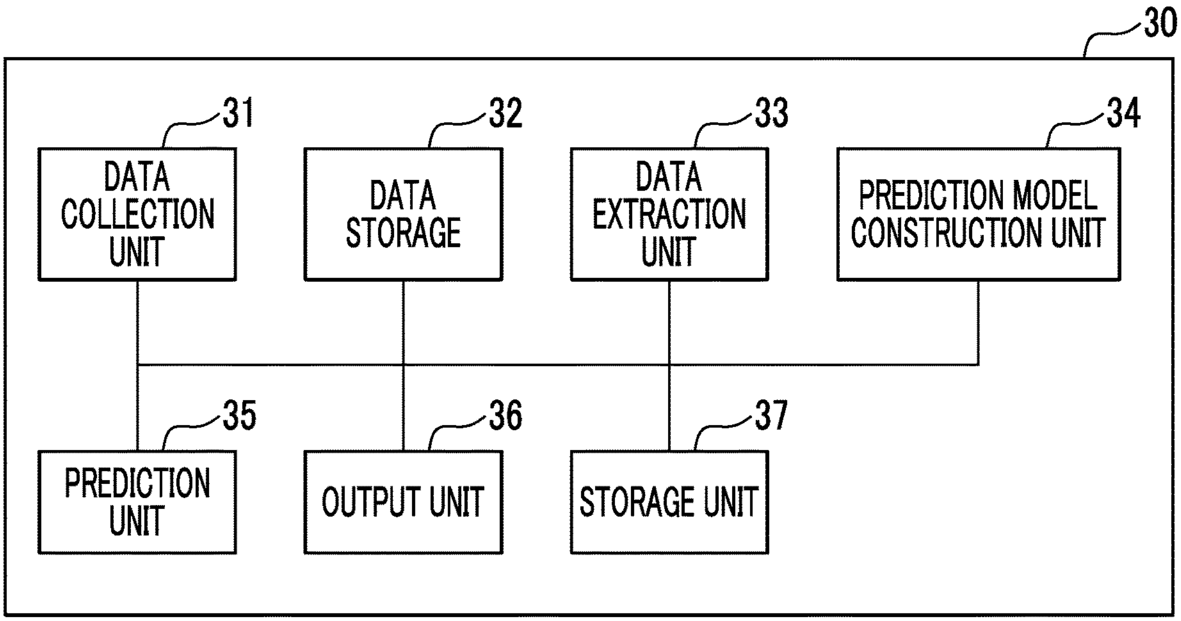
FIG. 2 is a block diagram of the prediction device according to a first embodiment of the present invention.

FIG. 2 is a block diagram of the prediction device according to the first embodiment of the present invention.

As illustrated in FIG. 2, the prediction device 30 includes a data collection unit 31, a data storage 32, a data extraction unit 33, a prediction model construction unit 34, a prediction unit 35, an output unit 36, and a storage unit 37.

The data collection unit 31 collects process data from the plant or a mechanical device that is a monitoring target.

The data storage 32 stores the process data, which is collected by the data collection unit 31, in the storage unit 37.

The data extraction unit 33 extracts data, which is required to construct a prediction model, from the process data collected by the data collection unit 31. For example, the data extraction unit 33 extracts data of the types required to construct the prediction model or extracts values in the required range (removes outliers and the like) In the case of a prediction model that predicts the combustion vibration of the combustor 12, the data of the types required to construct the prediction model is, for example, vibration data obtained by measuring the vibration of combustion air inside the combustor 12 (or data obtained by analyzing the frequency of vibration data by fast Fourier analysis), the opening degree command values of the fuel flow regulation valves 16A to 16C, the inlet temperature of the turbine 13, the angle of the IGV 17, and the like.

The prediction model construction unit 34 constructs a prediction model that predicts an operating state of the plant or the mechanical device by a statistical technique such as multiple regression analysis or Gaussian process regression, machine learning such as random forest, or deep learning such as a neural network. The prediction model construction unit 34 constructs an error calculation model that calculates an error of the constructed prediction model (variation or uncertainty of prediction). For example, the prediction model construction unit 34 constructs a prediction model and an error calculation model that have the values of predetermined input variables of the process data extracted by the data extraction unit 33, as input values, and have the value of a predetermined output variable as an output value to learn a relationship between both the input and output variables. The input variables are, for example, the opening degree command values of the fuel flow regulation valves 16A to 16C, the inlet temperature of the turbine 13, the degree of the IGV 17, atmospheric temperature, atmospheric humidity, an output of the gas turbine 10, vehicle compartment pressure, and the like. The output variable is, for example, the level of combustion vibration of the combustion air inside the combustor 12, emissions such as NOx and CO, a performance index such as output efficiency, or the like. For example, the prediction model construction unit 34 constructs a prediction model (function or the like) for combustion vibration which has the values of predetermined input variables (opening degree command values of the fuel flow regulation valves 16A to 16C, the inlet temperature of the turbine 13, and the degree of the IGV 17) of the process data extracted by the data extraction unit 33, as input values, and has the value of a predetermined output variable (vibration data of combustion vibration) as an output value to define a relationship between both the input and output variables. The error calculation model is a calculation formula that calculates a statistic such as a difference between the process data given as teacher data and the root mean square of the prediction value. In the case of the prediction model using regression analysis, a confidence interval of the prediction value may be used, and in the case of the prediction model using Gaussian process regression, an error directly obtained by a Gaussian process regression technique may be used. Examples of the prediction model and the error calculation model will be described later with reference to FIGS. 3 to 7.

The prediction unit 35 predicts an output value based on a prediction error for the predetermined output variables, based on the input variables of the process data collected by the data collection unit 31, the prediction model, and the error calculation model. At this time, the prediction unit 35 corrects the value of the output variable, which is predicted by the prediction model, with the value of the prediction error for the value of the output variable to generate a final prediction value. More specifically, the prediction unit 35 adds or subtracts the prediction error to or from the prediction value such that the corrected value is not safer than the value before correction or the corrected value is less efficient than the value before correction. The prediction unit 35 outputs the prediction value after addition or after subtraction (after correction) as the final prediction value. In such a manner, the prediction unit 35 uses the prediction error to obtain the prediction value on a safe side in terms of equipment protection or contract. For example, when the output variable is combustion vibration or the amount of emission of NOx or CO, the prediction unit 35 adds a prediction error to a prediction value to correct the prediction value in an increasing direction. When the output variable is a variable related to efficiency, the prediction unit 35 substracts a prediction error from a prediction value to correct the prediction value in a decreasing direction to thus calculate a final prediction value.

The output unit 36 outputs a prediction result.

The storage unit 37 stores the process data, the prediction model, the error calculation model, and the like.

Here, the prediction model and the error calculation model will be described.

FIG. 3 is one example of a table used to calculate a prediction error. FIG. 3 illustrates a distribution table of t values. The vertical axis of the table of FIG. 3 is the degree of freedom (the number of samples−1), the horizontal axis is reliability, and the values in the table are t values. For example, when the degree of freedom is 10 and the reliability is 0.900, the t value is 1.812, and when the degree of freedom is 25 and the reliability is 0.950 (corresponding to 2σ), the t value is 2.060. A method for calculating a confidence interval by using the distribution table illustrated in FIG. 3 is generally known. For example, in order to calculate a range including 95% of the process data, a confidence interval of 95% is calculated using the t values corresponding to the degrees of freedom in the column of a confidence coefficient=0.950. The variation (error) when the confidence interval is 95% is expressed as 2σ, and the variation when the confidence interval is 68%, which is not shown in the table, is expressed as a. Here, the confidence interval is evaluated on both sides, but may be evaluated on one side.

Figure 4:
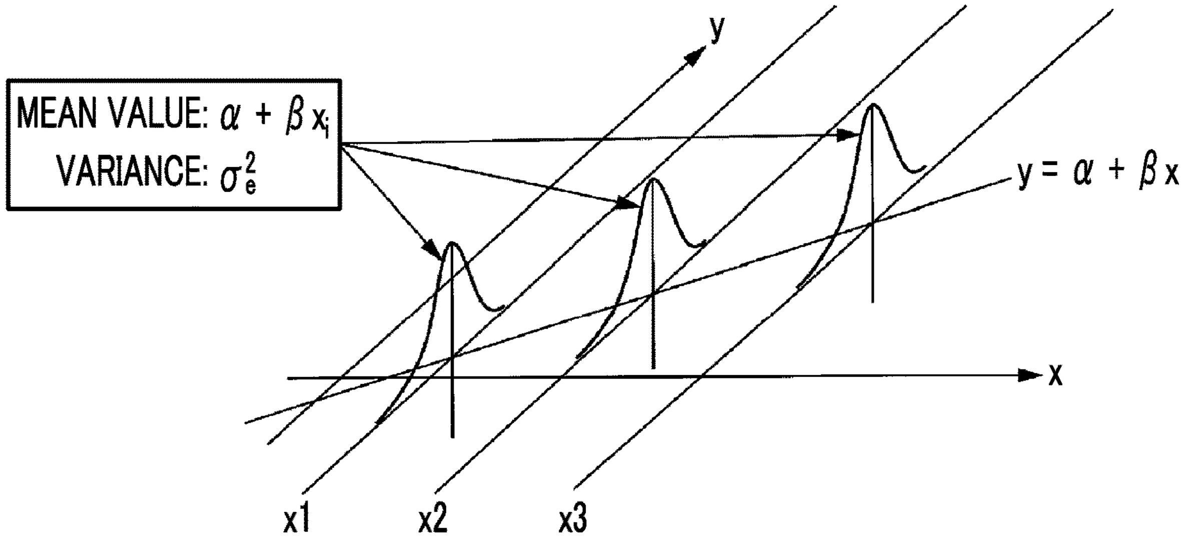
FIG. 4 is a first graph describing a prediction model using multiple regression analysis.

FIG. 4 is a first graph describing a prediction model using regression analysis.

In the case of multiple regression analysis, a prediction value y is expressed by an equation using a plurality of explanatory variables $x_1$, $x_2$, etc. When the prediction model using single regression is considered for convenience of description, the prediction value y can be obtained by the following equation using an explanatory variable x.

$$y=\alpha+\beta x \tag{1}$$

At this time, a variation (error) $\sigma_e$^ of the prediction value y is estimated by the following equation (2).

$$\hat{\sigma}_e^2 = \frac{\sum\left[\{y_i - (\hat{\alpha} + \hat{\beta}x_i)\}^2\right]}{n-2} \tag{2}$$

Here, the hat (^) means an estimate value, n means the data count, and i means the data number.

Therefore, the prediction value (mean value) and the distribution of variations (errors) thereof are as illustrated in FIG. 4, and the variations at each x coordinate are the same. When the horizontal axis takes x and the vertical axis takes the prediction value y, the following graph illustrated in FIG. 5 is obtained.

The same idea applies when a multivariate regression spline, a feedforward neural network, or the like is used as the prediction model.

Figure 5:
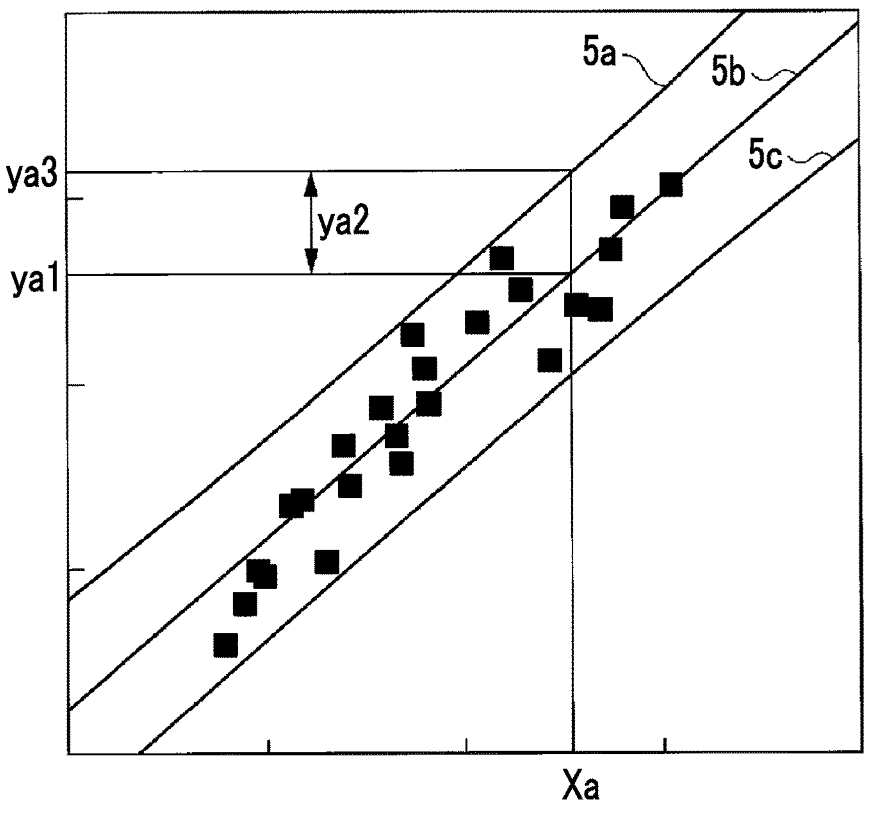
FIG. 5 is a second graph describing a prediction model using multiple regression analysis.

FIG. 5 is a second graph describing a prediction model using regression analysis.

The horizontal axis of FIG. 5 indicates the input value of the prediction model, and the vertical axis indicates the output value of the prediction model. Points marked with squares in the graph of FIG. 5 indicate process data, a line 5*b* indicates the prediction model, and lines 5*a* and 5*c* indicate an error calculation model. The prediction model construction unit 34 performs regression analysis on the process data to construct the prediction model of equation (1) and the error calculation model of equation (2). In FIG. 5, the model is visualized as a graph. Here, for example, the explanatory variable x is the flow rate ratio of fuel of the top hat system, and the prediction value y is combustion vibration. When xa is input as the explanatory variable x, the prediction unit 35 calculates a prediction value ya1 based on the prediction model and calculates an error ya2 based on the error calculation model to add ya2 to ya1 to thus generate ya3 as a final prediction value. The reason ya2 is added to ya1 is that when the prediction error is considered, the level of the combustion vibration may be higher by ya2 than the prediction value ya1 and when the combustion vibration is predicted as ya3 (ya1+ya2), the plant can be safely operated. The output unit 36 displays the final prediction value ya3 on a display or the like connected to the prediction device 30.

Figure 6:
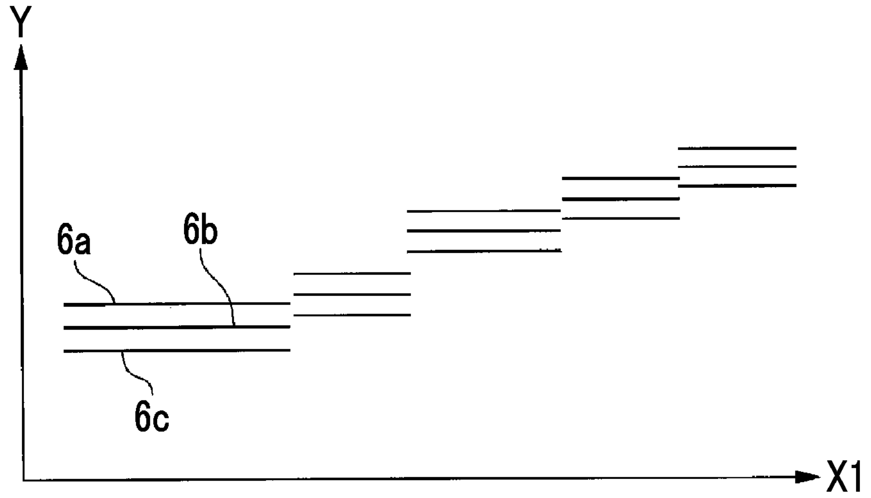
FIG. 6 is a graph describing a prediction model using random forest regression.

FIG. 6 is a graph describing a prediction model using random forest regression.

When the prediction model construction unit 34 constructs a prediction model by random forest regression, the prediction model construction unit 34 calculates the prediction model and an error calculation model which are visualized by a prediction value Y (line 6*b*) having a step shape and lines 6*a* and 6*c*, which illustrate a variation (error) of 2σ centered on Y, for an explanatory variable X1 as illustrated in FIG. 6. Similar to the example described with reference to FIG. 5, the prediction unit 35 calculates a prediction value based on the prediction model (line 6*b*) and a prediction error based on the error calculation model (lines 6*a* and 6*c*). Then, for example, when combustion vibration or the amounts of emission of NOx and CO are predicted, the prediction error is added to the prediction value to calculate a final prediction value. Meanwhile, when operation efficiency or the like is calculated, the prediction unit 35 subtracts the prediction error from the prediction value to calculate conservative efficiency as a final prediction value.

Figure 7:
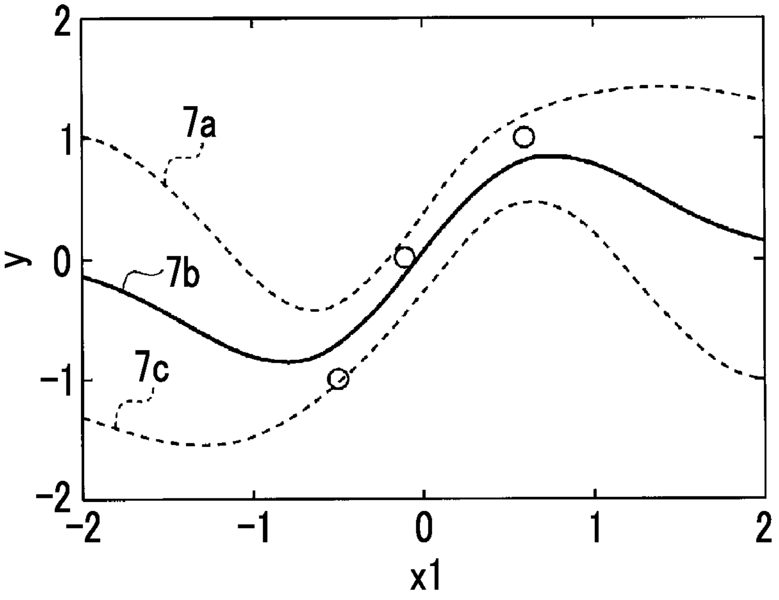
FIG. 7 is a graph describing a prediction model using Gaussian process regression.

FIG. 7 is a graph illustrating a prediction model using Gaussian process regression.

When the prediction model construction unit 34 constructs a prediction model by Gaussian process regression, the prediction model construction unit 34 can calculate lines 7*a* and 7*c* illustrating variations with respect to a line 7*b* illustrating the prediction model. In the case of Gaussian process regression, an error which differs according to the magnitude of the explanatory variable X1 can be calculated as illustrated.

In the case of Gaussian process regression, a distribution f(x) of a response surface can be obtained from data D (aggregation of sets of the explanatory variable x and an output y) as expressed by the following equation (3)

$$p(f(x)|D) = N\left(k^t\left(K + \sigma^2 I_N\right)^{-1} y,\ K_0 - k^t\left(K + \sigma^2 I_N\right)^{-1} k\right) \tag{3}$$

Here, when σ is a variance of observation noise, $\sigma_p$ is a variance of the prior distribution of a prediction target, and θ is a scaling parameter, $p(y|x, \sigma^2)$, $K_0$, k, and K(x, x') are as follows.

$$p(y|x, \sigma^2) = N\left(y|f(x), \sigma^2\right) \tag{4}$$

$$K_0 = K(x, x),\ k = (K(x, x_1), \ldots, K(x, x_N))^t \tag{5}$$

$$K(x, x') = \sigma_p^2 \exp\left(-\frac{1}{2}\frac{\|x - x'\|^2}{\theta^2}\right) \tag{6}$$

At this time, for example, the prediction value y (line 7*b*) and the prediction value y±2σ (y+2σ is the line 7*a* and y−2σ is the line 7*c*) are as illustrated in FIG. 7 for an explanatory variable $x_1$.

As described above, various prediction models and prediction errors illustrated in FIGS. 3 to 7 can be used as the prediction model and the error calculation model of the present embodiment. In the case of any model, the operating state of the gas turbine 10 can be evaluated as being on a safe side.

Figure 8:
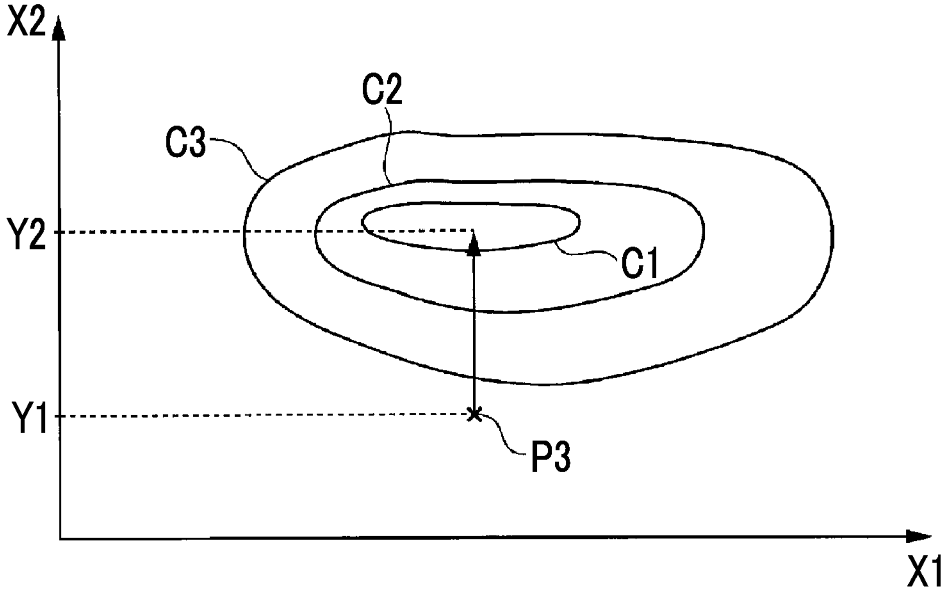
FIG. 8 is an example of an output by the prediction device according to the first embodiment of the present invention.

FIG. 8 is an example of an output by the prediction device according to the first embodiment of the present invention.

FIG. 8 illustrates an example of display of a final prediction value by the output unit 36. The output unit 36 may superimpose the graphs, which visualize the prediction model and the prediction error as illustrated in FIGS. 5 to 7, to display a relationship between a specific explanatory variable X and the final prediction value Y, which is predicted by the prediction unit 35, but can display a relationship between a plurality of explanatory variables X1 and X2 and the prediction value Y in a two-dimensional space as illustrated in FIG. 8. For example, in the case of the gas turbine 10, since the plurality of combustors 12 are installed, in order to construct a prediction model with good accuracy, the prediction model is required to be constructed in consideration of the individual difference of each of the combustors. For that purpose, a plurality of parameters which distinguish the individual differences are required. It is known that the characteristics of combustion vibration differ depending on the frequency of vibration. Therefore, when a prediction model of combustion vibration is constructed, the prediction model is required to be divided according to the frequency of vibration. In this case, the combustion vibration will show the overall characteristic by a plurality of the prediction models. For example, FIG. 8 illustrates a relationship between a control value Z of the combustion vibration level and the input variables X1 and X2 related to the combustion vibration. Lines C1 to C3 displayed like contour lines illustrate a relationship between the explanatory variables X1 and X2 when a combustion vibration level of a certain magnitude is generated. The line C3 on the outermost side corresponds to a combustion vibration level of 100% with respect to the control value Z (maximum allowable vibration level). The line C2 corresponds to a combustion vibration level of 75% with respect to the control value Z. The line C1 corresponds to a combustion vibration level of 50% with respect to the control value Z. Namely, it is meant that when the values of X1 and X2 can be controlled to values indicated by points inside the line C1, the combustion vibration can be suppressed to 50% or less of the control value Z. The graph illustrated in FIG. 8 can be obtained by constructing the prediction model (visualized in a three-dimensional mortar shape) and the error calculation model that define the relationship between two explanatory variables X1 and X2 and the prediction value Y and then two-dimensionally projecting relational expressions of the explanatory variables X1 and X2 at depths corresponding to 100%, 75%, and 50% of the value of the control value Z in a Z-axis direction. In such a process, the output unit 36 can generate an image in which the map-shaped graph as illustrated in FIG. 8 is displayed.

The lines C1 to C3 illustrated in FIG. 8 illustrate a range obtained by adding an error of 2σ to the prediction value. For example, the prediction model construction unit 34 may switch the range of the error to σ, 2σ, nσ, and the like to construct an error calculation model and to display the graph via the output unit 36, the graph being obtained by adding the range of the error to the prediction model. Regarding the graphs illustrated in FIGS. 5 to 7, the prediction model construction unit 34 may switch the range of the error to σ, 2σ, and the like in a stepwise manner to construct an error calculation model, and the output unit 36 may switch the graph to, for example, y±σ, y±2σ, and the like to display an image in which final prediction values therefor are superimposed. For example, when the accuracy (prediction error) of a prediction model is not certain, the range of an error may be switched to generate final prediction values, and a prediction value evaluated as being on the safest side and a prediction value evaluated as being optimistic may be output.

Next, the flow of a prediction model construction process of the present embodiment will be described.

Figure 9:
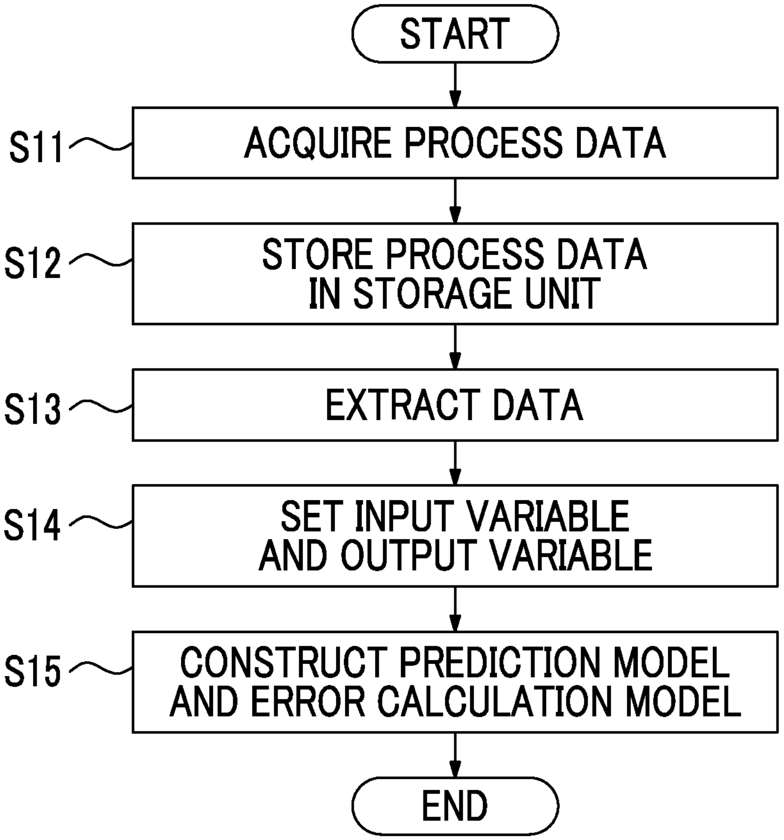
FIG. 9 is a flowchart illustrating one example of a prediction model construction process according to the first embodiment of the present invention.

FIG. 9 is a flowchart illustrating one example of the prediction model construction process according to the first embodiment of the present invention.

First, the data collection unit 31 acquires process data including the values of an input variable and an output variable required to construct a prediction model (step S11) Next, the data storage 32 stores the acquired process data in the storage unit 37 (step S12). Next, the data extraction unit 33 extracts and reads out process data, which is required for a predetermined prediction model, from the storage unit 37 to output the extracted process data to the prediction model construction unit 34 (step S13). The prediction model construction unit 34 sets the input variable and the output variable from the extracted process data (step S14). The prediction model construction unit 34 uses a technique such as multiple regression analysis, random forest regression, Gaussian process regression, and a neural network to construct, for example, the prediction model and the error calculation model illustrated in FIGS. 5 to 7 (step S15). In FIGS. 5 to 7, examples where one input variable and one output variable are set have been described; however, a plurality of types of input variables may be set. The prediction model construction unit 34 stores the constructed prediction model and error calculation model in the storage unit 37.

Figure 10:
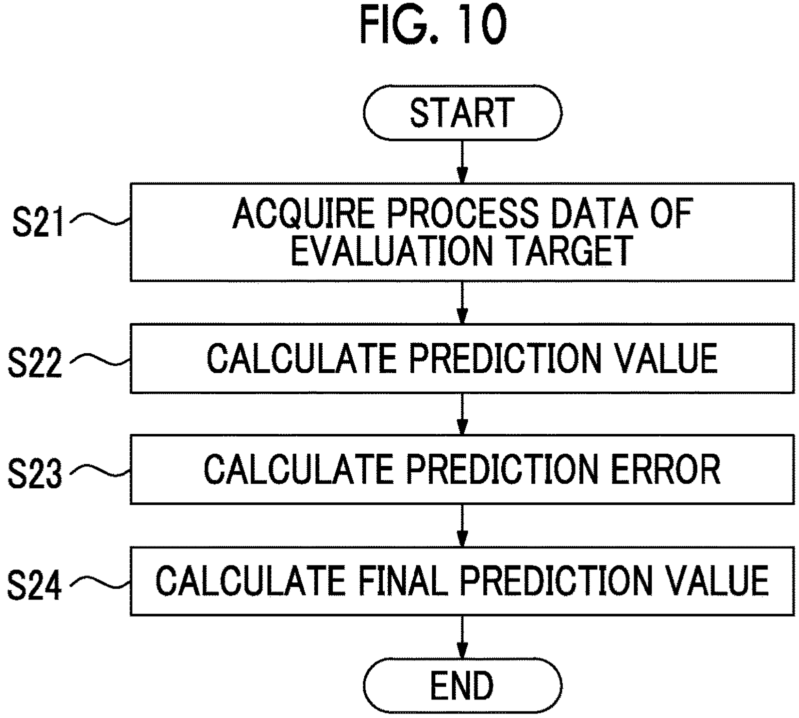
FIG. 10 is a flowchart illustrating one example of a prediction value calculation process according to the first embodiment of the present invention.

FIG. 10 is a flowchart illustrating one example of a prediction value calculation process according to the first embodiment of the present invention.

First, the data collection unit 31 acquires process data of an evaluation target including a predetermined input variable (step S21). The data storage 32 stores the acquired process data in the storage unit 37. Next, the data extraction unit 33 extracts and reads out process data, which is required to calculate a prediction value, from the storage unit 37. Next, the prediction unit 35 reads out a predetermined prediction model which predicts a prediction value of the evaluation target, and a predetermined error calculation model from the storage unit 37. The prediction unit 35 inputs the process data into the prediction model to calculate the prediction value (step S22). The prediction unit 35 inputs the prediction value and the process data into the error calculation model to calculate a prediction error (step S23). When the technique of constructing the prediction model is Gaussian process regression, the process data is input into the prediction model, so that the prediction value corresponding to the value of the process data and the prediction error can be obtained at the same time. The prediction unit 35 adds or subtracts the prediction error to or from the prediction value to calculate a final prediction value (step S24). At this time, the prediction unit 35 may output the prediction value before correction and the prediction error in addition to the final prediction value.

According to this embodiment, a model which calculates a prediction error together with a prediction value can be constructed from a plurality of process data (learning data) Process data of an evaluation target is input into a constructed model, and thus even when the influence of a prediction error of the prediction model is considered to the maximum extent, a corrected prediction value (final prediction value) which allows safe operation of the plant or the like can be obtained. In addition, there is no need for constructing a plurality of prediction models in order to obtain one prediction value.

Second Embodiment

A prediction device 30A of a second embodiment is a so-called operation guidance device that determines whether or not a prediction value predicted by the prediction unit 35 is within a predetermined allowable range, and when the prediction value is within the allowable range, provides an operation amount to converge the prediction value within the allowable range or information which guides determination of such an operation amount.

Figure 11:
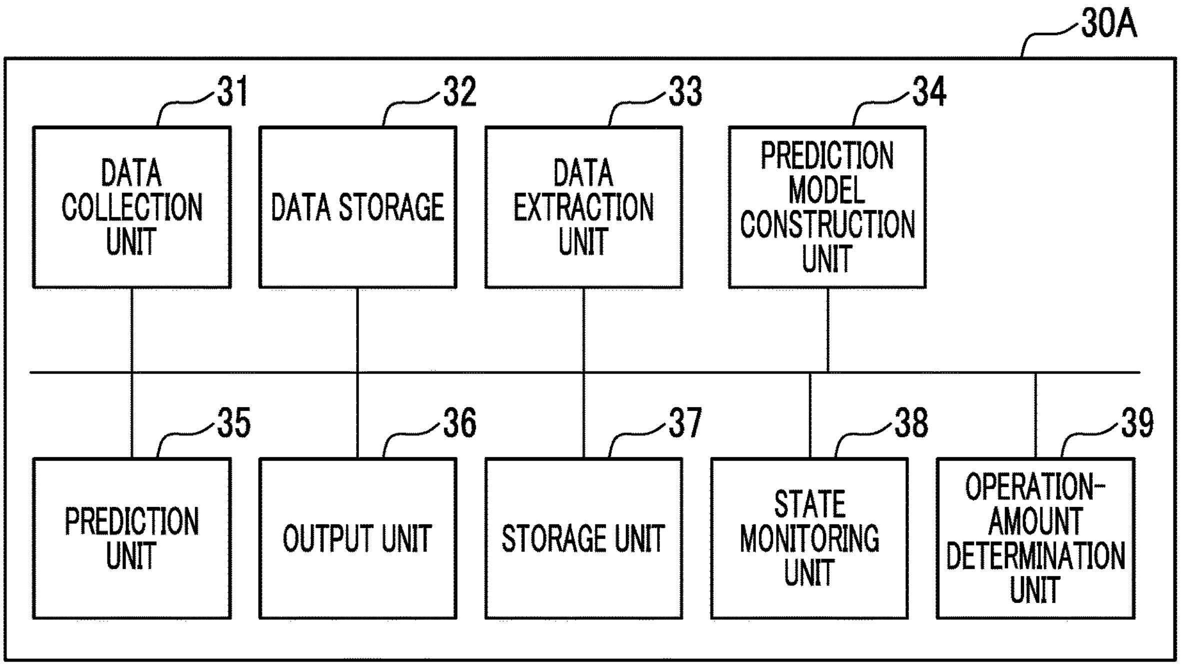
FIG. 11 is a block diagram of a prediction device according to a second embodiment of the present invention.

FIG. 11 is a block diagram of the prediction device according to the second embodiment of the present invention.

Among configurations according to the second embodiment of the present invention, the same functional units as those forming the prediction device 30 according to the first embodiment of the present invention are denoted by the same reference signs, and description thereof will be omitted. The prediction device 30A according to the second embodiment includes a state monitoring unit 38 and an operation-amount determination unit 39 in addition to the configuration of the first embodiment.

The state monitoring unit 38 monitors process data. Specifically, the state monitoring unit 38 compares the process data with a threshold value set for each of the process data to determine that there is abnormality, when the process data deviates from the threshold value. The threshold value used for the determination may be set based on a prediction model constructed by the prediction model construction unit 34. The state monitoring unit 38 may perform threshold determination on a final prediction value as a monitoring target, the final prediction value being predicted by the prediction unit 35 based on the process data.

When the state monitoring unit 38 determines that there is abnormality, the operation-amount determination unit 39 determines an operation amount or a control value of the plant or the mechanical device to avoid the abnormality. For example, when the level of combustion vibration is high, the operation-amount determination unit 39 determines an operation amount that lowers the level of combustion vibration (for example, how much the opening degree of the fuel flow regulation valve 16A is reduced or increased, or the like). For example, when the amount of emission of NOx or CO is large, the operation-amount determination unit 39 determines an operation amount that reduces the amount of emission thereof. For example, when the output efficiency of the gas turbine 10 is low, the operation-amount determination unit 39 determines an operation amount that improves the output efficiency. As will be described later, when an operation amount is determined, a prediction model which has the operation amount or process data related to the operation amount (for example, the flow rate of fuel supplied from the main system when the operation amount is the opening degree of the fuel flow regulation valve 16A) as an explanatory variable (input variable) can be used.

The output unit 36 outputs the operation amount, which is determined by the operation-amount determination unit 39, to the device 20. Alternatively, the output unit 36 displays the operation amount, which is determined by the operation-amount determination unit 39, on a display of the prediction device 30A or the like.

Figure 12:
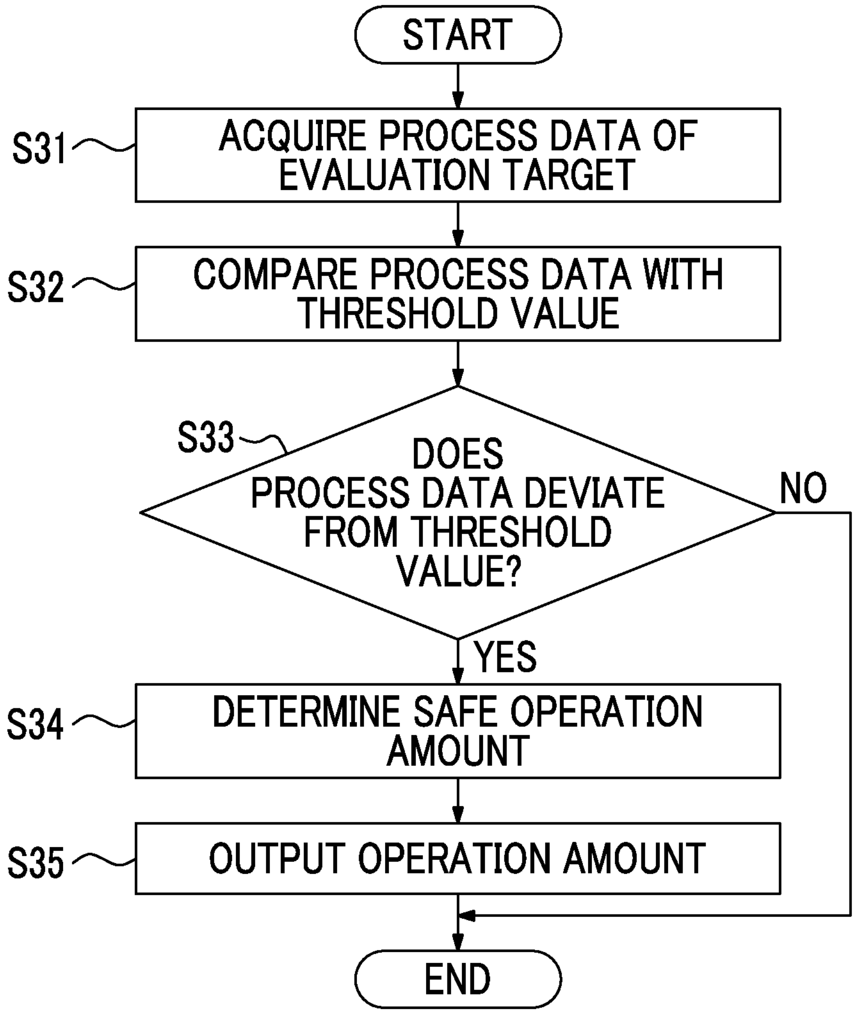
FIG. 12 is a flowchart illustrating one example of a process of determining an operation amount which improves an operating state according to the second embodiment of the present invention.

FIG. 12 is a flowchart illustrating one example of a process of determining an operation amount which improves an operating state according to the second embodiment of the present invention.

First, the data collection unit 31 acquires process data of an evaluation target including a predetermined input variable (step S31). The data collection unit 31 outputs the process data to the state monitoring unit 38. The state monitoring unit 38 compares each of a plurality of the process data with a corresponding threshold value (step S32) When there is process data deviating from the threshold value (step S33: Yes), the state monitoring unit 38 notifies the operation-amount determination unit 39 of a detection of abnormality. The operation-amount determination unit 39 acquires the process data (process data acquired in step S31) including an input variable for which the abnormality is detected, to determine a safe operation amount (step S34).

For example, the operation-amount determination unit 39 instructs the prediction unit 35 to output a final prediction value. The prediction unit 35 inputs the process data, which is acquired in step S31, into an input model to output the prediction value. Here, reference will be made to FIG. 8. It is assumed that the prediction value is P3 and the threshold value is set to the control value Z (line C3). Then, the operation-amount determination unit 39 determines an operation amount such that the prediction value is located as far away as possible from the boundary of the line C3 (located on a side where the combustion vibration level is further lowered, for example, located inside the line C1 corresponding to 50% of the control value Z and as far away as possible from the boundary of the line C1). In the case of P3 of FIG. 8, the operation amounts corresponding to the explanatory variable X1 are the same value, and an operation amount corresponding to the explanatory variable X2 when the explanatory variable X2 is changed from current Y1 to Y2 is determined. When the explanatory variable X2 is a valve opening degree or the like, the operation-amount determination unit 39 outputs the operation amount Y2, which is determined, to the device 20 via the output unit 36 (step S35). When the explanatory variable X2 is process data such as a fuel flow rate, the operation-amount determination unit 39 calculates a valve opening degree which realizes the fuel flow rate of Y2 after change, and outputs the value to the device 20. The device 20 controls the device based on the acquired operation amount. For example, when the operation amount Y2 which is changed is the opening degree command value of the fuel flow regulation valve 16C, the device 20 may perform control such that the opening degree of the fuel flow regulation valve 16C is Y2. Alternatively, the output unit 36 may display the operation amount Y2 on the display, and a monitoring person may input the operation amount, which lowers the combustion vibration level, to the device 20 with reference to the display.

When the process data is determined to be within the threshold value in step S33, the process is repeated from step S31 for the next process data.

Figure 13:
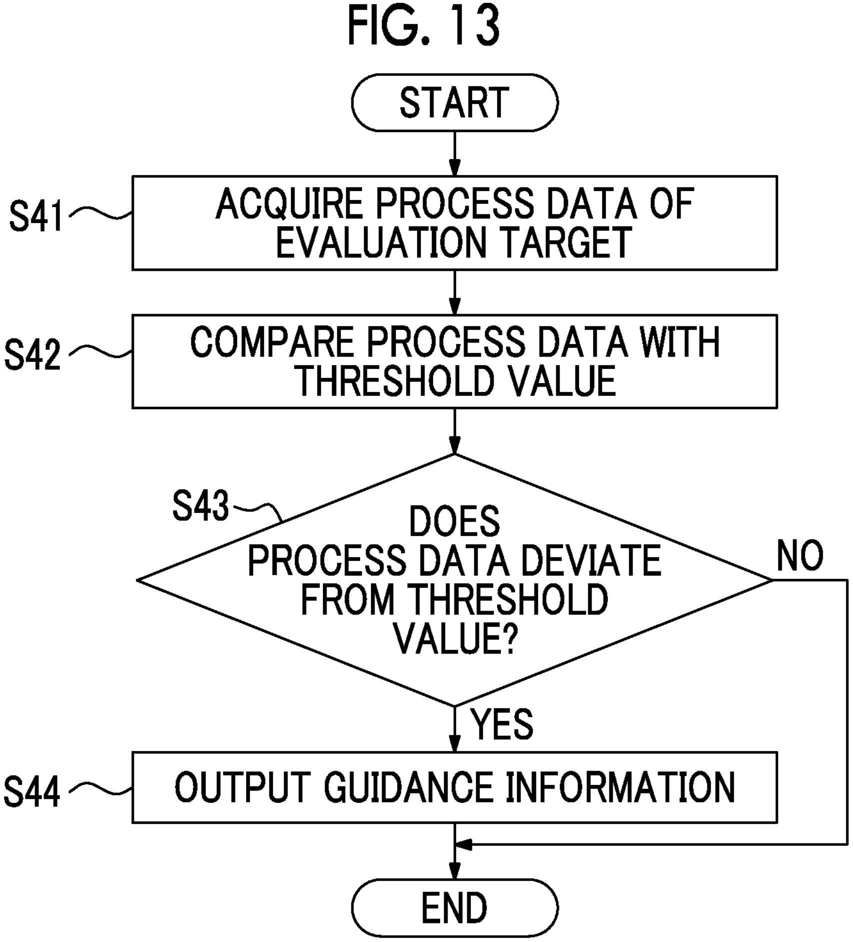
FIG. 13 is a flowchart illustrating one example of a process of outputting information which guides improvement of an operating state according to the second embodiment of the present invention.

FIG. 13 is a flowchart illustrating one example of a process of outputting information which guides improvement of the operating state according to the second embodiment of the present invention.

A process in which the prediction device 30A displays guidance information that guides determination of an operation amount which improves the operating state, instead of the operation amount, will be described with reference to FIG. 13. The process up to step S43 of the flowchart of FIG. 13 is the same as that of FIG. 12. Namely, the data collection unit 31 acquires process data of an evaluation target (step S41). Then, the state monitoring unit 38 compares the value of the process data with a threshold value (step S42). Then, when the process data deviates from the threshold value (step S43; Yes), the state monitoring unit 38 notifies the prediction unit 35 of a detection of abnormality. The prediction unit 35 acquires process data including an input variable for which the abnormality is detected and inputs the process data into a prediction model, and outputs a final prediction value. Then, the output unit 36 outputs guidance information that guides determination of the operation amount (step S44). For example, the output unit 36 generates an image in which the prediction value and a graph or map which visualizes the prediction model are superimposed. The output unit 36 outputs the generated image to a display to display the generated image on the display (step S44). Here, the image in which the prediction value and the graph which visualizes the prediction model are superimposed is an image in which a result of prediction by the prediction unit 35 illustrated in FIGS. 5 to 8 is displayed. As the result of prediction, only the final prediction value may be displayed or the prediction value obtained by the prediction model and the prediction error obtained by the error calculation model may be displayed. For example, when the guidance information illustrated in FIG. 8 is displayed, the monitoring person can determine an operation amount, which normalizes the operating state, with reference to P3 and an arrow of FIG. 8.

According to the present embodiment, in addition to the effects of the first embodiment, the plant or the mechanical device can be stably operated by the operation amount that is determined by the operation-amount determination unit 39 based on the prediction value on a safe side based on uncertainty of the prediction model, the prediction value being predicted by the prediction unit 35, or guidance information output by the output unit 36.

Figure 14:
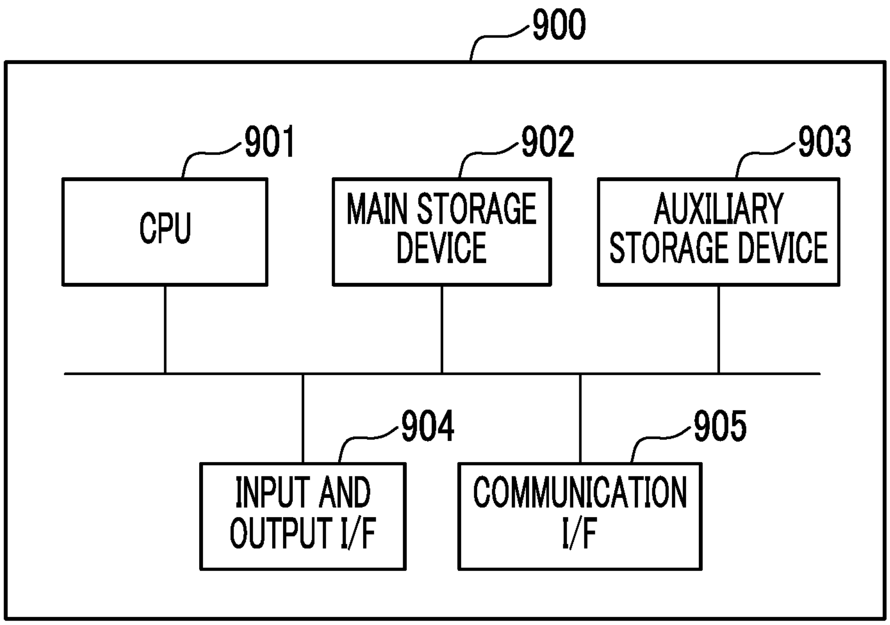
FIG. 14 is a block diagram illustrating one example of a hardware configuration of the prediction device according to each of the embodiments of the present invention.

FIG. 14 is a block diagram illustrating one example of a hardware configuration of the prediction device according to each of the embodiments of the present invention.

A computer 900 is, for example, a personal computer (PC) or a server terminal device including a CPU 901, a main storage device 902, an auxiliary storage device 903, an input and output interface 904, and a communication interface 905. The prediction devices 30 and 30A described above are implemented in the computer 900. Then, the operation of each of the processing units described above is stored in the auxiliary storage device 903 in the form of a program. The CPU 901 reads out the program from the auxiliary storage device 903 to expand the program in the main storage device 902, and to then execute the above processes according to the program. The CPU 901 secures a storage area, which corresponds to the storage unit 37, in the main storage device 902 according to the program. The CPU 901 secures a storage area, which stores data being processed, in the auxiliary storage device 903 according to the program.

In at least one embodiment, the auxiliary storage device 903 is one example of a non-transitory medium. Other examples of the non-transitory medium include a magnetic disk, a magneto-optical disk, a CD-ROM, a DVD-ROM, a semiconductor memory, and the like that are connected via the input and output interface 904. When the program is delivered to the computer 900 by a communication line, the computer 900 which receives the delivery may expand the program in the main storage device 902 to execute the above processes. The program may realize a part of the above-described functions. Further, the program may be a so-called differential file (differential program) that realizes the above-described functions in combination with another program already stored in the auxiliary storage device 903.

In addition, well-known components can be appropriately replaced with the components in the embodiments without departing from the spirit of the present invention. The technical scope of the present invention is not limited to the embodiments, and various modifications can be made without departing from the spirit of the present invention. The output unit 36 is one example of a first output unit and a second output unit.

INDUSTRIAL APPLICABILITY

According to the prediction device, the prediction method, and the program, the prediction value based on the influence of the prediction error of the prediction model can be output.

REFERENCE SIGNS LIST

30, 30A Prediction device
31 Data collection unit
32 Data storage
33 Data extraction unit
34 Prediction model construction unit
35 Prediction unit
36 Output unit
37 Storage unit
38 State monitoring unit
39 Operation-amount determination unit

The invention claimed is:

1. A prediction device comprising:

a sensor configured to measure at least temperature or pressure of a device as measurement data;

a non-transitory memory configured to store a program; and a hardware processor configured to execute the program and control the prediction device to operate as:

a data collection unit that collects process data of the device including the measurement data;

a prediction model construction unit that constructs a prediction model having a predetermined input variable of first process data as an input value and having a predetermined output variable of the process data as an output value, and an error calculation model which calculates a prediction error of the prediction model, based on the first process data collected by the data collection unit; and a prediction unit that outputs a corrected prediction value which is obtained by correcting a prediction value of the output variable with the prediction error calculated based on the error calculation model, the prediction value being calculated based on the input variable of second process data collected by the data collection unit and on the prediction model, wherein when adding the prediction error to the prediction value would result in the corrected prediction value being not safer or being less efficient than the prediction value before correction with regard to operation of the device in an industrial or manufacturing process, the prediction unit obtains the corrected prediction value by intentionally adding the prediction error to the prediction value to intentionally obtain the corrected prediction value that is not safer or is less efficient than the prediction value before correction, and wherein when subtracting the prediction error from the prediction value would result in the corrected prediction value being not safer or being less efficient than the prediction value before correction with regard to operation of the device in an industrial or manufacturing process, the prediction unit obtains the corrected prediction value by intentionally subtracting the prediction error from the prediction value to intentionally obtain the corrected prediction value that is not safer or is less efficient than the prediction value before correction.

2. The prediction device according to claim 1, further comprising:

a state monitoring unit that compares the process data with a predetermined threshold value to determine whether or not the process data is abnormal; and an operation-amount determination unit that calculates an operation amount which improves the corrected prediction value when the state monitoring unit determines that the process data is abnormal.

3. The prediction device according to claim 2, further comprising:

a first output unit that outputs the operation amount, which is calculated by the operation-amount determination unit, to a control device of the device.

4. The prediction device according to claim 1, further comprising:

a second output unit that displays the corrected prediction value and a graph, which visualizes the prediction model, in a superimposed manner.

5. A prediction method performed by a prediction device, the prediction device including a non-transitory memory configured to store a program and a hardware processor configured to execute the program and control the prediction device to perform the prediction method, the prediction method comprising:

a step of measuring at least temperature or pressure of a device as measurement data;

a step of collecting process data of the device including the measurement data;

a step of constructing a prediction model having a predetermined input variable of first process data as an input value and having a predetermined output variable of the process data as an output value, and an error calculation model which calculates a prediction error of the prediction model, based on the first process data collected in the step of collecting the process data;

a step of collecting second process data of an evaluation target; and a step of outputting a corrected prediction value that is obtained by correcting a prediction value of the output variable with the prediction error calculated based on the error calculation model, the prediction value being calculated based on the input variable of the collected second process data and on the prediction model, wherein when adding the prediction error to the prediction value would result in the corrected prediction value being not safer or being less efficient than the prediction value before correction with regard to operation of the device in an industrial or manufacturing process, the step of outputting the corrected prediction value includes intentionally adding the prediction error to the prediction value to intentionally obtain the corrected prediction value that is not safer or is less efficient than the prediction value before correction, and wherein when subtracting the prediction error from the prediction value would result in the corrected prediction value being not safer or being less efficient than the prediction value before correction with regard to operation of the device in an industrial or manufacturing process, the step of outputting the corrected prediction value includes intentionally subtracting the prediction error from the prediction value to intentionally obtain the corrected prediction value that is not safer or is less efficient than the prediction value before correction.

6. A non-transitory medium storing a program that when executed by a computer controls the computer to perform a prediction method comprising:

measuring at least temperature or pressure of a device as measurement data;

collecting process data of the device including the measurement data;

constructing a prediction model having a predetermined input variable of first process data as an input value and having a predetermined output variable of the process data as an output value, and an error calculation model which calculates a prediction error of the prediction model, based on the first process data collected in a step of collecting the process data;

collecting second process data of an evaluation target; and outputting a corrected prediction value that is obtained by correcting a prediction value of the output variable with the prediction error calculated based on the error calculation model, the prediction value being calculated based on the input variable of the collected second process data and on the prediction model, wherein when adding the prediction error to the prediction value would result in the corrected prediction value being not safer or being less efficient than the prediction value before correction with regard to operation of the device in an industrial or manufacturing process, the step of outputting the corrected prediction value includes intentionally adding the prediction error to the prediction value to intentionally obtain the corrected prediction value that is not safer or is less efficient than the prediction value before correction, and wherein when subtracting the prediction error from the prediction value would result in the corrected prediction value being not safer or being less efficient than the prediction value before correction with regard to operation of the device in an industrial or manufacturing process, the step of outputting the corrected prediction value includes intentionally subtracting the prediction error from the prediction value to intentionally obtain the corrected prediction value that is not safer or is less efficient than the prediction value before correction.

7. The prediction device according to claim 1, wherein the prediction model construction unit sets a plurality of ranges of the errors, and constructs the error calculation model for each of the ranges of the errors, and wherein the prediction unit outputs a prediction value indicating the safest and a prediction value indicating the unsafest out of the corrected prediction values which are obtained by correcting based on the error calculation model for each of the ranges of the errors with regard to operation of the device in the industrial or manufacturing process.

* * * * *